United States Patent [19]

Wang

[11] Patent Number: 6,150,929
[45] Date of Patent: Nov. 21, 2000

[54] WARNING DEVICE OF AUXILIARY LEG SUPPORT OF MOTORCYCLE

[76] Inventor: Yo-Tzu Wang, P.O. Box 453, Taichung, Taiwan

[21] Appl. No.: 09/519,371

[22] Filed: Mar. 6, 2000

[51] Int. Cl.⁷ .......................................................... B62J 3/00
[52] U.S. Cl. ........................ 340/432; 340/438; 340/686.1; 180/219; 280/293; 280/304
[58] Field of Search ..................................... 340/426, 427, 340/432, 438, 686.1; 280/293, 301, 304; 180/219

[56] References Cited

U.S. PATENT DOCUMENTS

| | | | |
|---|---|---|---|
| 4,315,244 | 2/1982 | Cole, Jr. ................................. | 340/427 |
| 4,641,124 | 2/1987 | Davis ..................................... | 340/426 |
| 4,817,977 | 4/1989 | Bookbinder ........................... | 280/304 |

*Primary Examiner*—Daniel J. Wu

[57] ABSTRACT

A warning device is intended to alert a motorcyclist to retract the auxiliary leg support of the motorcycle before operating the motorcycle. The warning device comprises a detection control unit fastened with the body frame of the motorcycle, a detection element fastened with the wheel of the motorcycle, and a trigger switch fastened with the auxiliary leg support of the motorcycle. In the event that the auxiliary leg support is not retracted, and that the wheel of the motorcycle is in motion at the same time, the signals are transmitted by the detection element and the trigger switch to the detection control unit, thereby causing the detection control unit to trigger the horn of the bicycle to blare.

1 Claim, 3 Drawing Sheets

WARNING DEVICE OF AUXILIARY LEG SUPPORT OF MOTORCYCLE

FIELD OF THE INVENTION

The present invention relates generally to an auxiliary leg support of motorcycle, and more particularly to a device for warning a motorcyclist of his or her negligence of retracting the auxiliary leg support of the motorcycle in operation.

BACKGROUND OF THE INVENTION

The motorcycle is generally provided with a primary leg support and an auxiliary leg support, which are used to support the motorcycle in an upright position at the time when the motorcycle is parked. Some absent-minded or careless motorcyclists often fail to retract the auxiliary leg support of the motorcycle before they operate the motorcycle. An unretracted auxiliary leg support of the motorcycle in operation poses a safety hazard.

SUMMARY OF THE INVENTION

The primary objective of the present invention is to provide a motorcycle with a device to warn of an operator of the motorcycle at the time when the auxiliary leg support of the motorcycle is not retracted prior to the operation of the motorcycle.

In keeping with the principle of the present invention, the foregoing objective of the present invention is attained by a warning device which is formed of a detection control unit, a detection element, and a trigger switch. The detection control unit is actuated by the power source switch of a motorcycle and is provided with an output end which is connected with a horn of the motorcycle. The detection element is fastened with the wheel frame to detect the motion of the wheel so as to transmit the signal to the input end of the detection control unit. The trigger switch is fastened with the auxiliary leg support of the motorcycle for transmitting a signal to the input end of the detection control unit at such time when the auxiliary leg support is not retracted.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
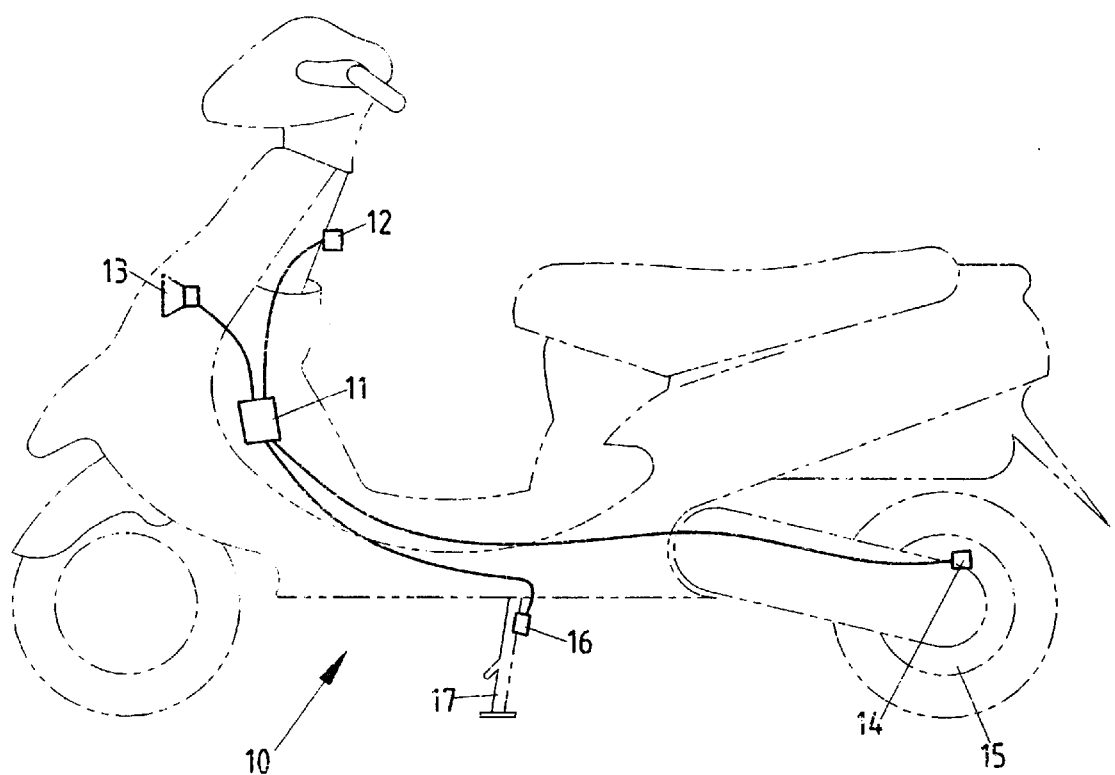
FIG. 1 shows a schematic view of a layout of the preferred embodiment of the present invention.
Figure 2:
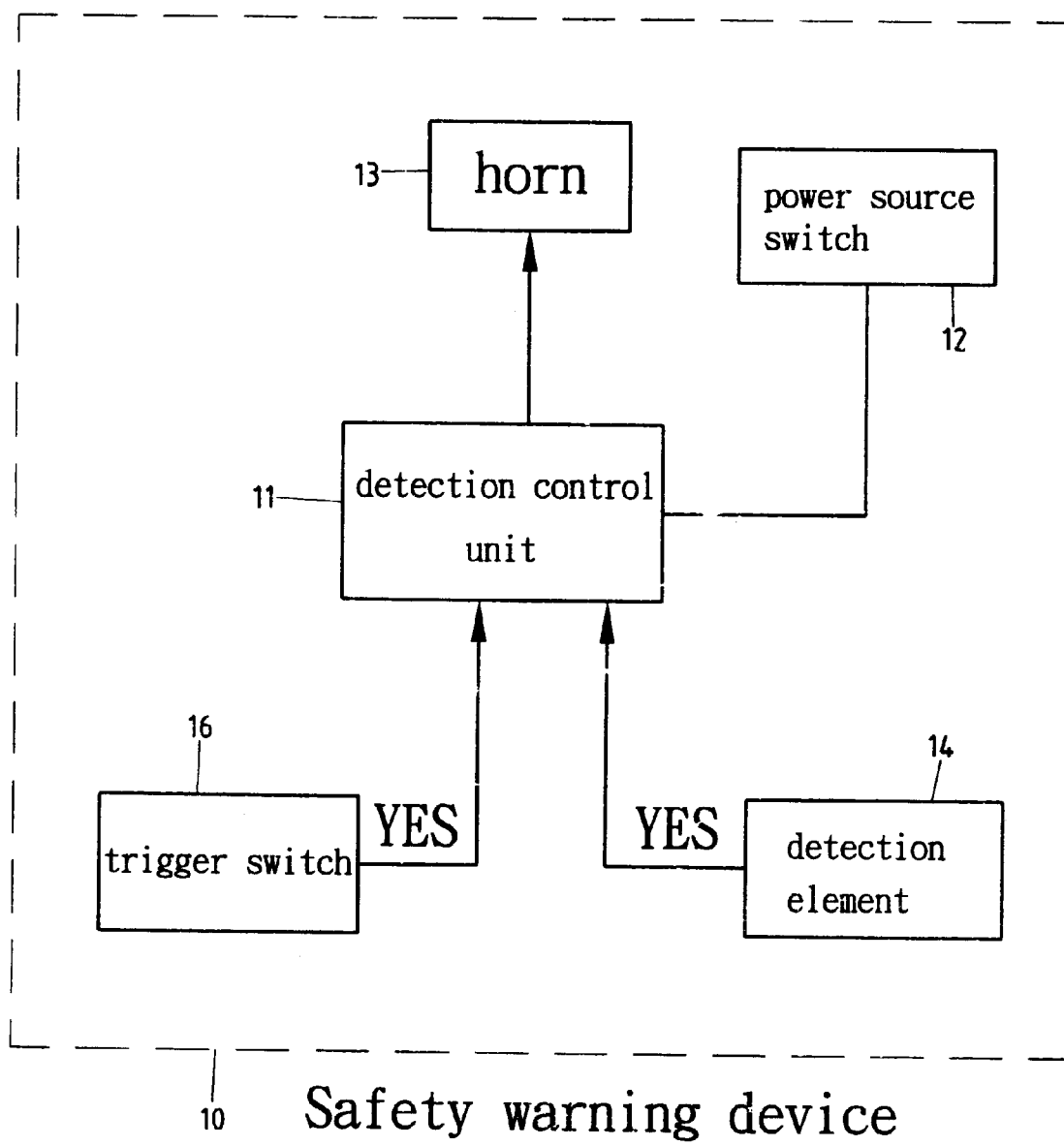
FIG. 2 shows a block diagram of the preferred embodiment of the present invention.
Figure 3:
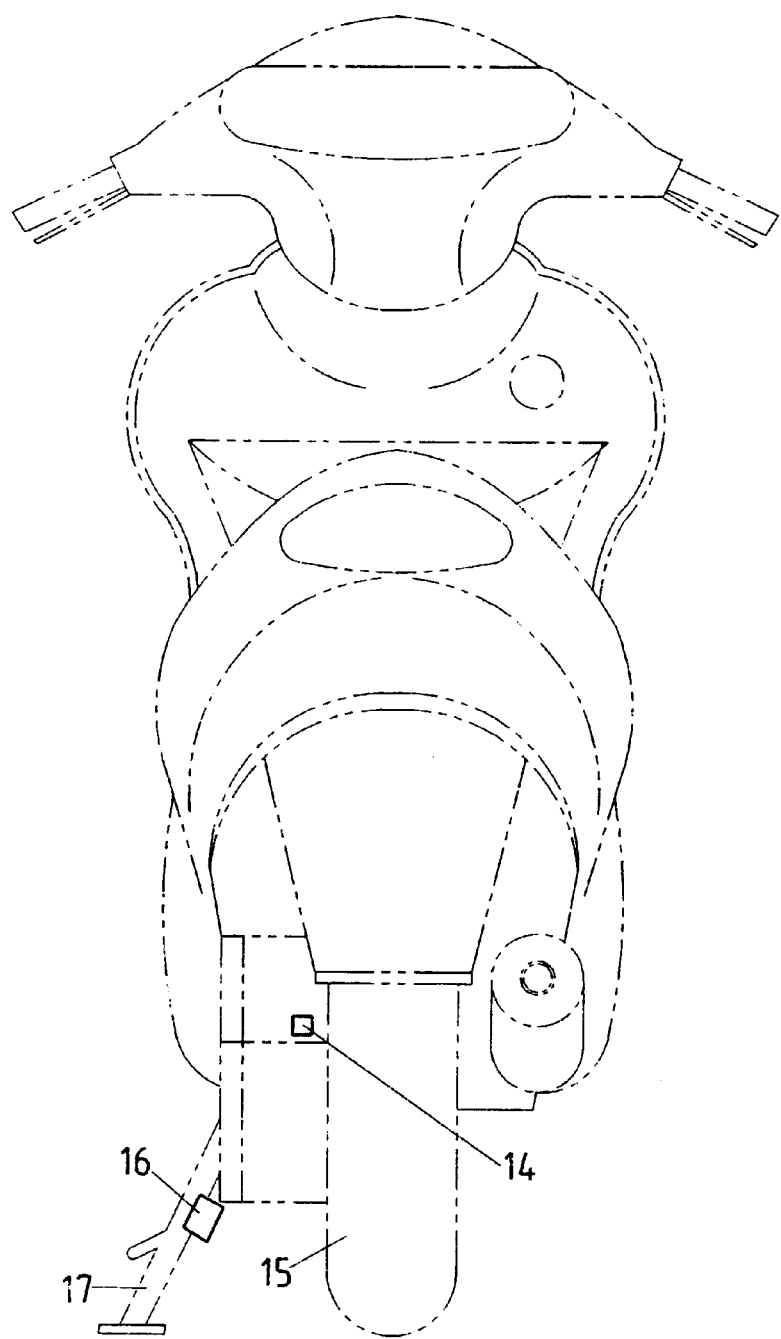
FIG. 3 shows a rear view of the layout of the preferred embodiment of the present invention.

As shown in FIGS. 1–3, warning device 10 embodied in the present invention is formed of a detection control unit 11, a detection element 14, and a trigger switch 16.

The detection control unit 11 is actuated by a motorcycle power source switch 12 and is connected at the output end thereof with a horn 13 of the motorcycle.

The detection element 14 is mounted on the wheel frame of the motorcycle for detecting the motion of the wheel rim 15 and is connected with the input end of the detection control unit 11.

The trigger switch 16 is fastened with an auxiliary leg support 17 and is connected with the input end of the detection control unit 11.

The warning device 10 of the present invention is activated whenever the motorcycle power source switch 12 is started. In the event that the wheel rim 15 is in motion, and that the auxiliary leg support 17 is not retracted, a signal is transmitted from the output end of the detection control unit 11 of the warning device 10 to the horn 13, which is thus caused to blare to alert the motorcyclist. The warning device 10 of the present invention is triggered only at such time when the detection control unit 11 receives signals from the detection element 14 and the trigger switch 16. For this reason, the warning device 10 of the present invention will not be triggered at the time when the wheel rim 15 remains stationary even if the auxiliary leg support 17 is not retracted.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A warning device of an auxiliary leg support of the motorcycle, said warning device comprising:

a detection control unit fastened with a frame of the motorcycle and connected with a power source switch of the motorcycle such that said detection control unit is actuated by the power source switch of the motorcycle;

a detection element fastened with a wheel frame of the motorcycle for detecting the motion of a wheel rim, said detection element being connected with an input end of said detection control unit; and a trigger switch fastened with the auxiliary leg support of the motorcycle for transmitting a signal to said detection control unit in the event that the auxiliary leg support is not retracted;

said detection control unit being connected at an output end thereof with a horn of the motorcycle such that said detection control unit causes the horn of the motorcycle to blare at such time when the auxiliary leg support is not retracted and the wheel rim of the motorcycle is in motion at the same time.

* * * * *